United States Patent [19]
Lin

[11] Patent Number: 5,632,194
[45] Date of Patent: May 27, 1997

[54] INFUSION MAKER

[76] Inventor: Yu-Mei Lin, P.O. Box 82-144, Taipei, Taiwan

[21] Appl. No.: 740,555

[22] Filed: Oct. 30, 1996

[51] Int. Cl.⁶ .................. A47J 31/02; A47J 31/10; A47J 31/18; A23F 3/00
[52] U.S. Cl. .................. 99/285; 99/295; 99/299; 99/305; 99/306; 99/323
[58] Field of Search .................. 99/323.3, 279–305, 99/306–323; 141/87; 210/453–455, 464, 474, 482, 496; 220/8; 426/77, 82, 241, 433, 435

[56] References Cited

U.S. PATENT DOCUMENTS

| | | | |
|---|---|---|---|
| 933,917 | 9/1909 | Norwood | 99/323 |
| 1,665,143 | 4/1928 | McMillan | 99/299 |
| 2,187,029 | 1/1940 | Hevers | 99/279 |
| 2,885,290 | 5/1959 | Krasker | 99/306 |
| 3,063,359 | 11/1962 | Brant | 99/287 |
| 4,167,136 | 9/1979 | Chupurdy | 99/322 X |
| 4,520,716 | 6/1985 | Hayes | 99/295 X |
| 4,577,080 | 3/1986 | Grossman | 426/241 X |
| 4,697,503 | 10/1987 | Okabe et al. | 99/306 |
| 4,986,172 | 1/1991 | Hunnicutt, Jr. | 99/306 |
| 5,010,221 | 4/1991 | Grossman et al. | 99/300 X |
| 5,095,185 | 3/1992 | Fuchs, Jr. | 99/305 X |
| 5,185,505 | 2/1993 | Grzywana | 99/306 X |

*Primary Examiner*—Timothy F. Simone
*Attorney, Agent, or Firm*—Alfred Lei

[57] ABSTRACT

An infusion maker including a beaker having an inside annular flange in the middle, an inner cup mounted in the beaker for containing boiling water for steeping tea and having a bottom center through hole, a cap coupled to the inner cup at the bottom through a slip joint to hold a ball in a ball socket thereof, and a lid covered on the inner cup, the ball being forced to close the bottom center through hole of the inner cup when the inner cup is put in the beaker and supported on the inside annular flange of the beaker, the ball being disengaged from the bottom center through hole of the inner cup when the inner cup is lifted from the inside annular flange of the beaker, for permitting prepared tea infusion to flow out of the inner cup to the beaker.

3 Claims, 5 Drawing Sheets

INFUSION MAKER

BACKGROUND OF THE INVENTION

1. Field of the Invention

This invention relates to infusion makers, and relates more particularly to such an infusion maker which comprises a beaker, an inner cup mounted in the beaker for containing boiling water for steeping tea, and ball valve means coupled to the inner cup to control the passage of the bottom center through hole of the inner cup.

2. Description of the Prior Art

Regular infusion makers for preparing tea are commonly comprised of a cup, a strainer suspended in the cup at the top for holding tea leaves, and a lid covered on the cup. Because the strainer is suspended in the cup at the top, tea leaves cannot be fully dipped in boiling water in the cup. Furthermore, when the strainer is taken out of the cup, tea infusion will drop from the strainer to wet nearby area.

SUMMARY OF THE INVENTION

This invention relates to infusion makers, and relates more particularly to such an infusion maker which comprises a beaker, an inner cup mounted in the beaker for containing boiling water for steeping tea, and ball valve means coupled to the inner cup to control the passage of the bottom center through hole of the inner cup.

According to the preferred embodiment of the present invention, the infusion maker comprises a beaker having an inside annular flange in the middle, an inner cup mounted in the beaker for containing boiling water for steeping tea and having a bottom center through hole, a cap coupled to the inner cup at the bottom through a slip joint to hold a ball in a ball socket thereof, and a lid covered on the inner cup, the ball being forced to close the bottom center through hole of the inner cup when the inner cup is put in the beaker and supported on the inside annular flange of the beaker, the ball being disengaged from the bottom center through hole of the inner cup when the inner cup is lifted from the inside annular flange of the beaker, for permitting prepared tea infusion to flow out of the inner cup to the beaker.

DETAILED DESCRIPTION OF THE PREFERRED EMBODIMENT

Figure 1:
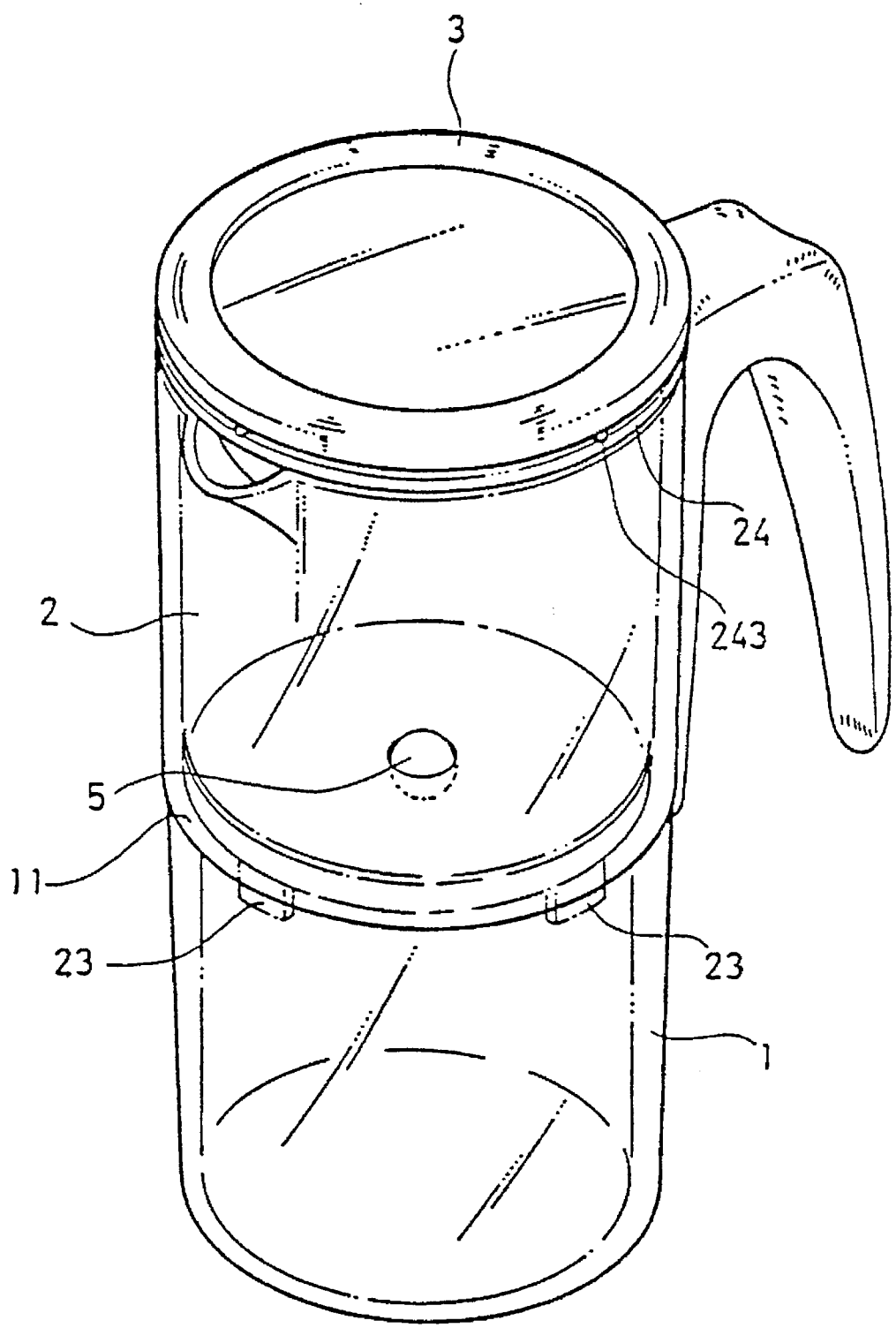
FIG. 1 is a perspective elevational view of an infusion maker according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
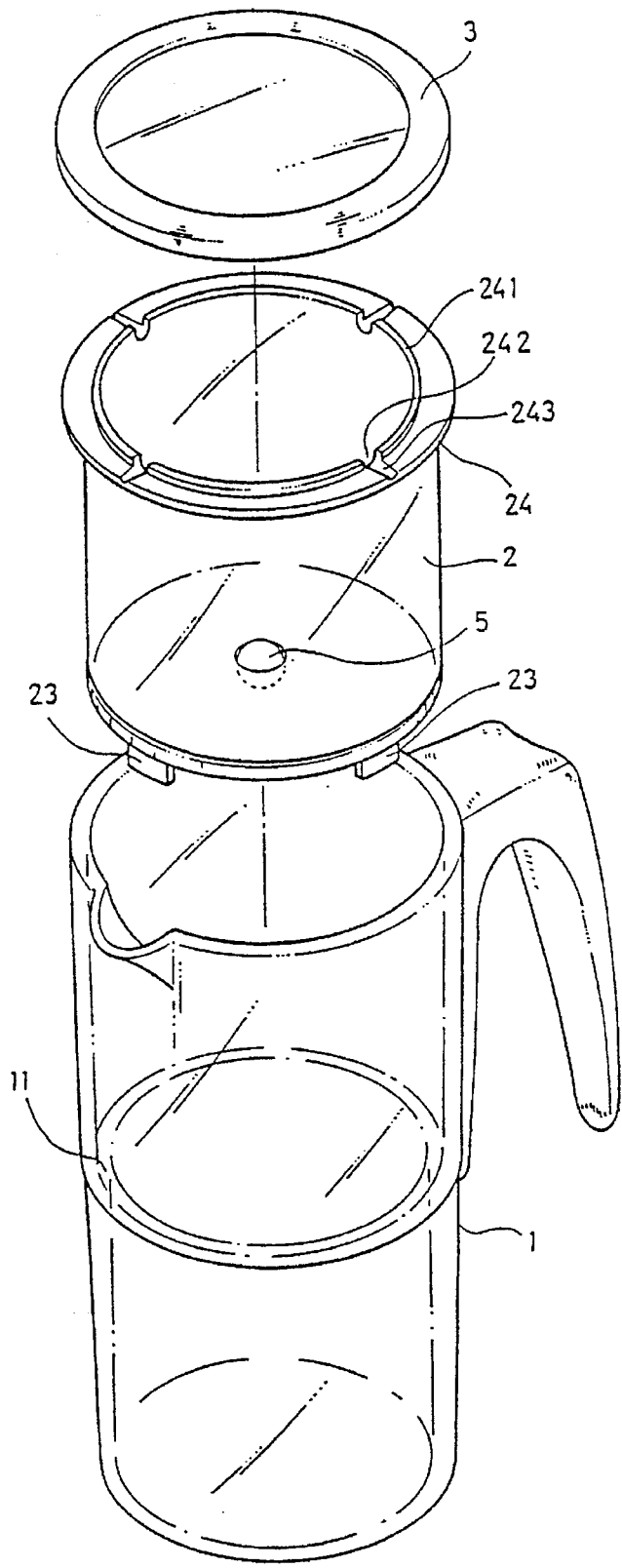
FIG. 2 is an exploded view of the infusion maker shown in FIG. 1.
Figure 3:
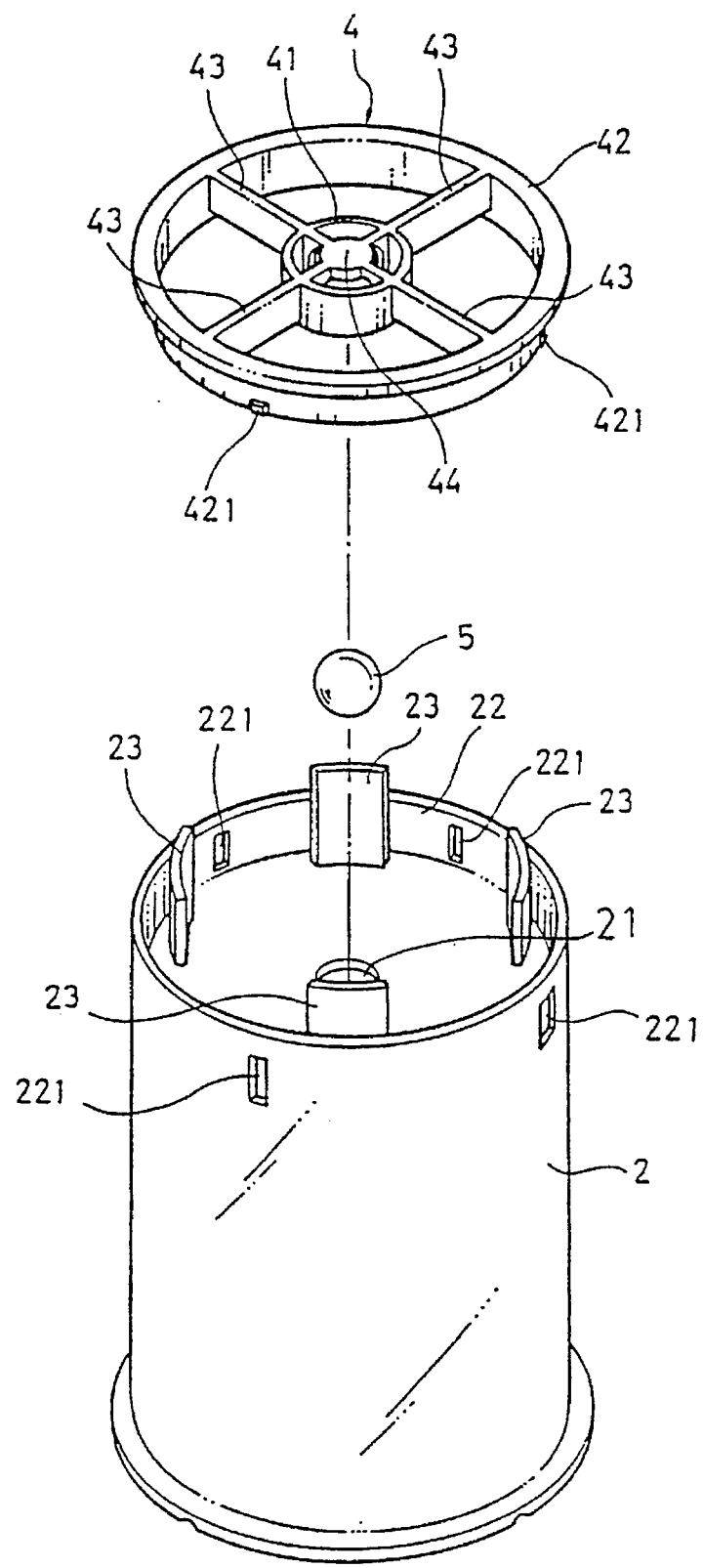
FIG. 3 is an exploded view of the inner cup, the ball, and the cap according to the present invention.

Referring to FIGS. 1, 2, and 3, an infusion maker in accordance with the present invention, is generally comprised of a beaker 1, an inner cup 2, a lid 3, a cap 4, and a steel ball 5. The beaker 1 has an inside annular flange 11 raised around the inside wall in the middle. The inner cup 2 comprises a bottom center through hole 21, a downward annular flange 22 downwardly raised from the periphery of the bottom side thereof, a plurality of equiangularly spaced oblong slots 221 through the downward annular flange 22, and a plurality of legs 23 raised from the bottom side and extended out of the downward annular flange 22 for supporting the inner cup 2 on a flat surface. The cap 4 comprises an inner race 41, an outer race 42 concentrically spaced around the inner race 41, a plurality of radial ribs 43 connected between the inner race 41 and the outer race 42, a ball socket 44 suspended within the inner race 41, and a plurality of equiangularly spaced hooks 421 raised from the periphery of the outer race 42. The ball 5 is adapted for mounting in the ball socket 44 of the cap 4.

Figure 4:
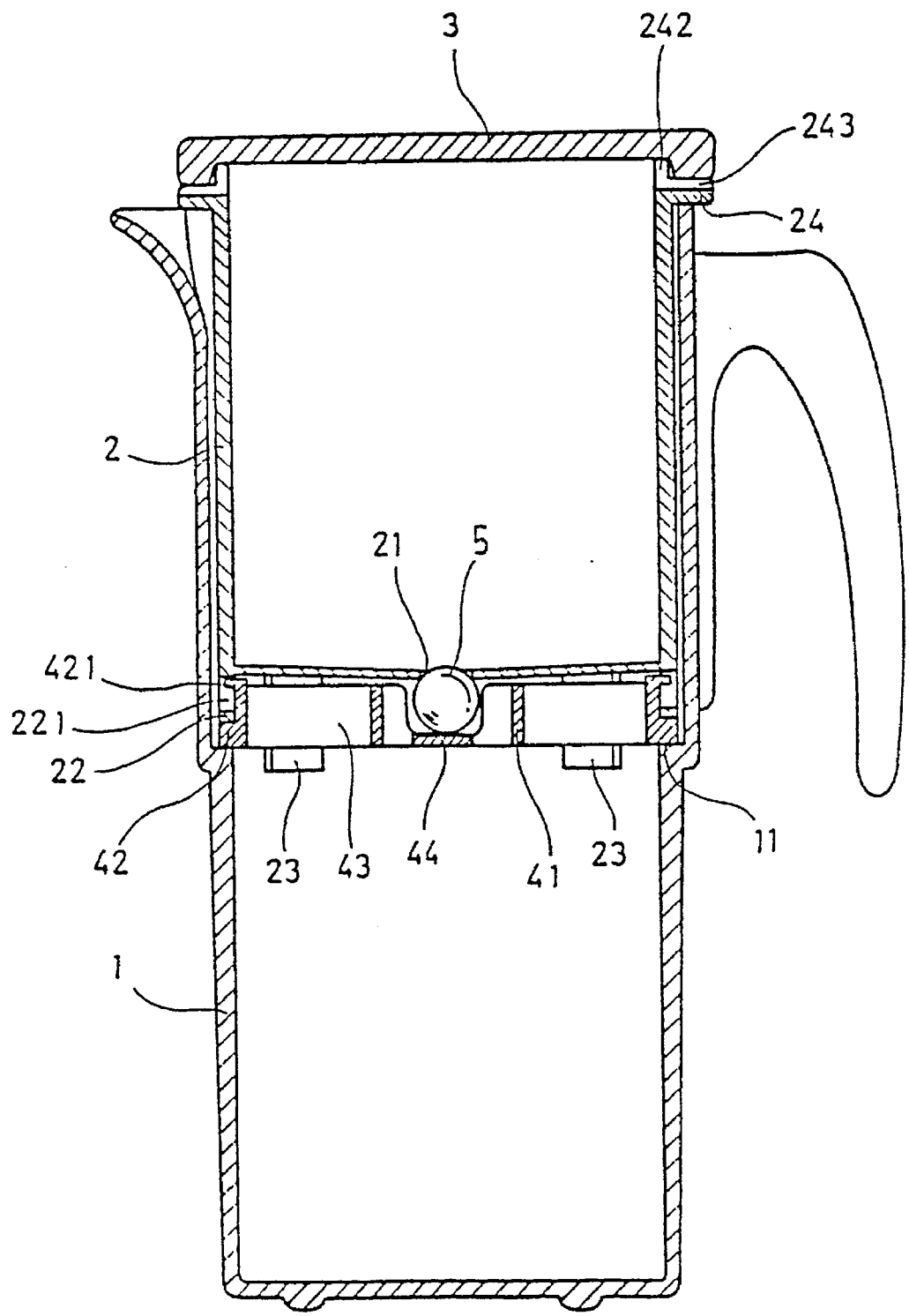
FIG. 4 is a sectional view of the present invention, showing the ball forced into engagement with the bottom center through hole of the inner cup.

Referring to FIG. 4 and FIGS. 1 to 3 again, when the ball 5 is mounted in the ball socket 44 of the cap 4, the outer race 42 of the cap 4 is inserted into the space defined at the bottom side of the inner cup 2 within the downward annular flange 22, permitting the hooks 421 to be respectively forced into the oblong slots 221 of the inner cup 2. When the hooks 421 of the cap 4 are respectively forced into the oblong slots 221 of the inner cup 2, the cap 4 is retained to the inner cup 2, and can be moved vertically relative to the inner cup 2 within the constraint of the oblong slots 221. When the inner cup 2 is put in the beaker 1, the cap 4 is stopped above the inside annular flange 11, and the inner cup 2 is forced to lower relative to the inner cup 2 by its gravity weight, thereby causing the ball 5 to be forced into engagement with the bottom center through hole 21 of the inner cup 2, and therefore the bottom center through hole 21 of the inner cup 2 is closed. When the bottom center through hole 21 of the inner cup 2 is closed, the user can steep tea leaves in boiling water in the inner cup 2.

Figure 5:
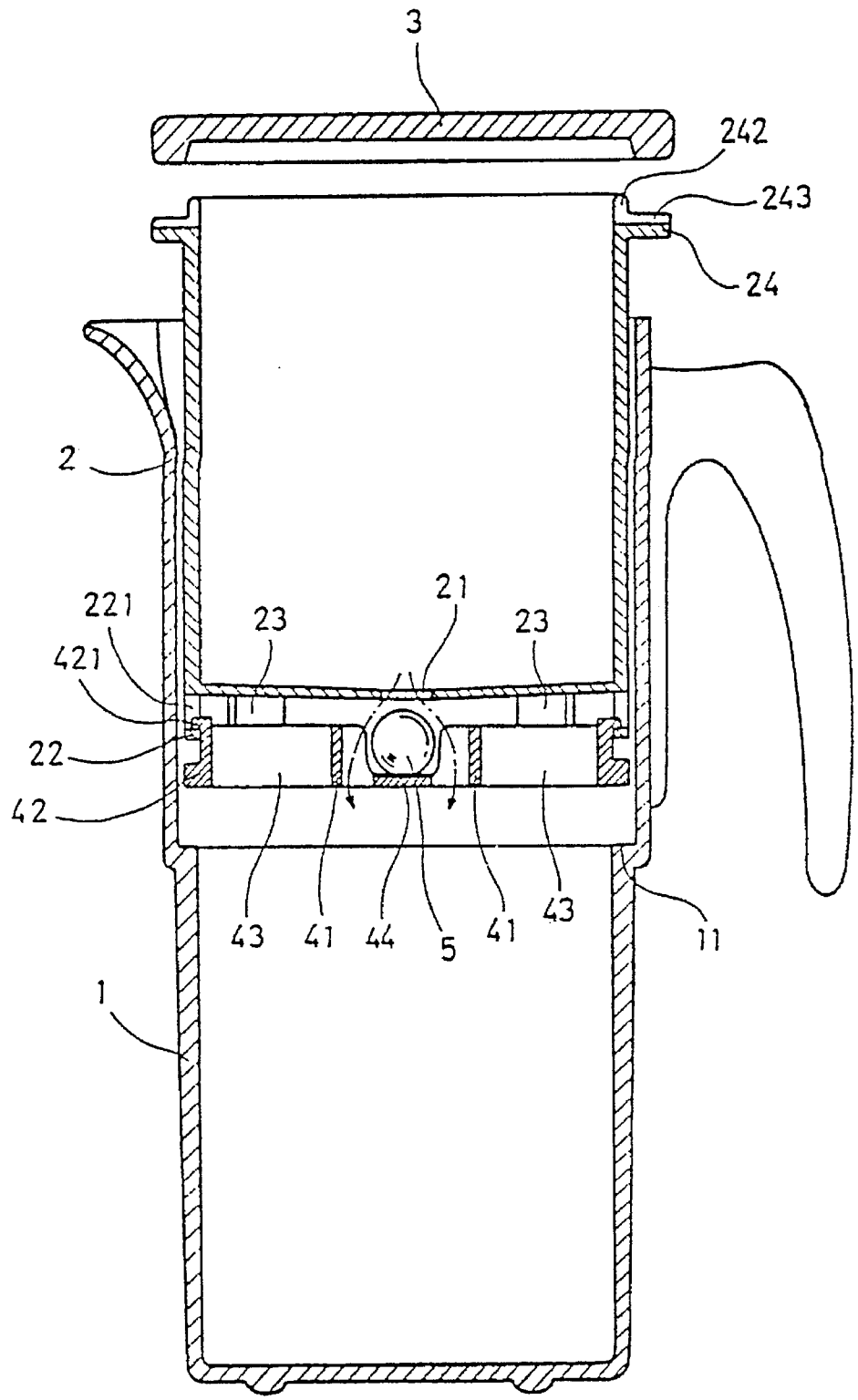
FIG. 5 is another sectional view of the present invention, showing the inner cup lifted from the inside annular flange of the beaker, and the ball disengaged from the bottom center through hole of the inner cup.

Referring to FIG. 5, when the inner cup 2 is lifted from the inside annular flange 11 of the beaker 1, the cap 4 is lowered relative to the inner cup 2, causing the ball 5 to disengage from the bottom center through hole 21 of the inner cup 2, and therefore the bottom center through hole 21 is opened, permitting tea infusion to flow out of the inner cup 2 through the bottom center through hole 21 to the beaker 1.

Referring to FIG. 2 again, the inner cup 2 further comprises a horizontal top flange 24 raised around the periphery of the top open side thereof, an upright coupling flange 241 raised from the horizontal top flange 24 and adapted for coupling to the lid 3, and radial grooves 243 equiangularly spaced at the horizontal top flange 24 through the upright coupling flange 241. When the lid 3 is coupled to the upright coupling flange 241 and covered on the inner cup 2, air is allowed to pass through the radial grooves 243, therefore the inside pressure of the inner cup 2 is balanced with the atmospheric pressure and, tea infusion is allowed to flow out of the inner cup 2 to the beaker 1 smoothly when the inner cup 2 is lifted from the inside annular flange 11 of the beaker 1.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An infusion maker comprising:

a beaker having an inside annular flange raised around an inside wall thereof;

an inner cup adapted for supported on the inside annular flange of said beaker for containing boiling water for steeping tea, said inner cup comprising a top open side, a bottom close side, a bottom center through hole through the center of said bottom close side, a downward annular flange downwardly raised from the periphery of said bottom close side, and a plurality of equiangularly spaced oblong slots at said downward annular flange;

a cap mounted within the downward annular flange of said inner cup, said cap comprising an inner race, an outer race concentrically spaced around said inner race, a plurality of radial ribs connected between said inner race and said outer race, a ball socket suspended within said inner race, and a plurality of equiangularly spaced hooks raised from said outer race and hooked in the oblong slots of the downward annular flange of said inner cup to secure said cap to said inner cup and to let said cap to be moved axially relative to said inner cup within the constraint of the oblong slots of said inner cup; and a ball mounted in the ball-socket of said cap to close/open the bottom center through hole of said inner cup, said ball being forced into engagement with the bottom center through hole of said inner cup to close its passage when said inner cup with said cap are put in said beaker and supported on the inside annular flange of said beaker, said ball being disengaged from the bottom center through hole of said inner cup to open its passage when said inner cup is lifted from the inside annular flange of said beaker.

2. The infusion maker as claimed in claim 1, wherein said inner cup comprises a horizontal top flange raised around the periphery of the top open side, an upright coupling flange raised from said horizontal top flange and adapted for coupling to said lid, and radial grooves equiangularly spaced at said horizontal top flange through said upright coupling flange for permitting air to pass in and out of said inner cup when said lid is closed on said inner cup.

3. The infusion maker as claimed in claim 1, wherein said inner cup comprises a plurality of legs raised from the bottom close side and extended out of said downward annular flange, and adapted for supporting said inner cup on a flat surface.

* * * * *